US010051587B2

(12) United States Patent
Jayaraman et al.

(10) Patent No.: US 10,051,587 B2
(45) Date of Patent: Aug. 14, 2018

(54) SYSTEM FOR NETWORK DISCOVERY AND SYNCHRONIZATION

(71) Applicant: Google Inc., Mountain View, CA (US)

(72) Inventors: Arunkumar Jayaraman, San Jose, CA (US); Rajkumar Samuel, Cupertino, CA (US); Peter Paul Gelbman, Mountian View, CA (US); Michael John Hart, San Jose, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 14/795,859

(22) Filed: Jul. 9, 2015

(65) Prior Publication Data
US 2017/0013572 A1    Jan. 12, 2017

(51) Int. Cl.
| | | |
|---|---|---|
| *H04W 56/00* | (2009.01) | |
| *H04W 48/16* | (2009.01) | |
| *H04W 84/18* | (2009.01) | |
| *H04W 16/28* | (2009.01) | |
| *H04W 40/24* | (2009.01) | |

(52) U.S. Cl.
CPC ......... *H04W 56/001* (2013.01); *H04W 48/16* (2013.01); *H04W 56/0025* (2013.01); *H04W 16/28* (2013.01); *H04W 40/24* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,606,175 B1 * | 10/2009 | Maufer | ................ | H04W 8/005 370/255 |
| 9,516,615 B2 * | 12/2016 | Stacey | ............. | H04W 56/0015 |
| 2006/0215581 A1 * | 9/2006 | Castagnoli | ............. | H04L 43/00 370/254 |

(Continued)

FOREIGN PATENT DOCUMENTS

| | | |
|---|---|---|
| WO | WO 2006/102558 | 9/2006 |
| WO | WO 2008/031049 | 3/2008 |

OTHER PUBLICATIONS

International Search Report and Written Opinion in International Application No. PCT/US2016/041549, dated Dec. 19, 2016, 17 pages.

(Continued)

*Primary Examiner* — Suk Jin Kang
(74) *Attorney, Agent, or Firm* — Fish & Richardson P.C.

(57) ABSTRACT

Methods, systems, and apparatus, including computer programs encoded on computer storage media, for maintaining, by a cloud controller, data representing a topology of a network of nodes; receiving, at the cloud controller from the first group of nodes, one or more requests to connect to the network; selecting, by the cloud controller, a first node in the first group of nodes that sent the request; and generating, by the cloud controller, instructions configured to cause the first node to communicate a timestamp of the first node to each neighboring node of the first node and to cause each neighboring node to communicate the timestamp of the first node to each other neighboring nodes of the neighboring node; and sending the instructions to the first node, thereby synchronizing the nodes in the network to the timestamp of the first node.

28 Claims, 6 Drawing Sheets

(56) References Cited

U.S. PATENT DOCUMENTS

| | | | | |
|---|---|---|---|---|
| 2006/0215582 A1* | 9/2006 | Castagnoli | ............. | H04L 45/02 370/254 |
| 2006/0215583 A1* | 9/2006 | Castagnoli | ............. | H04L 45/02 370/254 |
| 2009/0228732 A1* | 9/2009 | Budde | .................. | H04B 7/269 713/400 |
| 2009/0290511 A1* | 11/2009 | Budampati | ........... | H04J 3/0641 370/254 |
| 2009/0290572 A1* | 11/2009 | Gonia | .................. | H04J 3/0641 370/350 |
| 2014/0153440 A1* | 6/2014 | Zhou | .................... | H04W 40/12 370/254 |
| 2014/0153444 A1* | 6/2014 | Zhou | .................... | H04W 40/12 370/256 |
| 2014/0254426 A1* | 9/2014 | Abraham | ............. | H04W 48/10 370/254 |
| 2014/0286251 A1 | 9/2014 | Kohli | | |
| 2014/0293851 A1* | 10/2014 | Abraham | .......... | H04W 52/0225 370/311 |
| 2014/0293991 A1* | 10/2014 | Abraham | .......... | H04W 52/0225 370/350 |
| 2014/0293992 A1* | 10/2014 | Abraham | .......... | H04W 52/0225 370/350 |
| 2014/0313966 A1* | 10/2014 | Shukla | ................. | H04W 48/10 370/312 |
| 2014/0341073 A1* | 11/2014 | Abraham | ............. | H04W 48/18 370/254 |
| 2015/0296544 A1* | 10/2015 | Kim | ..................... | H04W 56/00 370/329 |
| 2016/0065405 A1* | 3/2016 | Wang | .................... | H04L 41/04 370/254 |
| 2016/0066249 A1* | 3/2016 | Dukes | ................ | H04W 40/246 370/255 |
| 2016/0135122 A1* | 5/2016 | Abraham | ............. | H04W 52/02 370/311 |
| 2016/0174016 A1* | 6/2016 | Moon | .................. | H04W 4/005 370/329 |
| 2016/0198494 A1* | 7/2016 | Huang | ............. | H04W 74/0833 370/329 |
| 2016/0212606 A1* | 7/2016 | Qi | ....................... | H04L 65/4076 |
| 2016/0345242 A1* | 11/2016 | Kim | ..................... | H04W 48/16 |
| 2016/0374011 A1* | 12/2016 | Huang | ................ | H04W 8/005 |
| 2016/0380872 A1* | 12/2016 | Halvarsson | .......... | H04W 24/08 370/252 |

OTHER PUBLICATIONS

Invitation to Pay Additional Fees in International Application No. PCT/US2016/041549, dated Oct. 25, 2016, 6 pages.

* cited by examiner

SYSTEM FOR NETWORK DISCOVERY AND SYNCHRONIZATION

BACKGROUND

This specification relates to a system for discovering and synchronizing nodes in a network.

A mesh network of nodes has a network topology in which each node relays data for the network. Each node can transmit data as far as a neighboring node. Data can be transmitted over long distances by splitting the transmission into a series of short hops between neighboring nodes.

The network can be reliable and offer redundancy. When one node can no longer operate, remaining nodes can still communicate with each other directly or through one or more intermediate nodes.

SUMMARY

In general, this specification describes a system for discovering and synchronizing nodes that communicate wirelessly with directional antennas.

In general, one innovative aspect of the subject matter described in this specification can be embodied in methods that includes the actions of maintaining, by a cloud controller, data representing a topology of a network of nodes, wherein the data indicates a first group of nodes that are connected to the cloud controller and indicate, for each node in the network, one or more respective neighboring nodes for the node, and wherein each node communicates wirelessly with a neighboring node by forming a transmitting node and receiving node pair during a particular time interval, wherein the transmitting node of the pair communicates data to the receiving node of the pair during a particular time interval when the transmitting node is in a transmitting mode and the receiving node is in a receiving mode; receiving, at the cloud controller from the first group of nodes, one or more requests to connect to the network; selecting, by the cloud controller, a first node in the first group of nodes that sent the request; and generating, by the cloud controller, instructions configured to cause the first node to communicate a timestamp of the first node to each neighboring node of the first node and to cause each neighboring node to communicate the timestamp of the first node to each other neighboring nodes of the neighboring node, wherein nodes synchronize their respective timestamps upon receipt of the timestamp of the first node, wherein communicating the timestamp continues until each node in the network has been synchronized to the timestamp of the first node; and sending the instructions to the first node, thereby synchronizing the nodes in the network to the timestamp of the first node.

Implementations can include one or more of the following features. Upon receiving, by the first node, the instructions, the first node scans for neighboring nodes, and wherein each neighboring node synchronizes its respective timestamp with the timestamp of the first node. For each neighboring node, the neighboring node scans for other respective neighboring nodes, and wherein each of the other respective neighboring nodes synchronizes its respective timestamp with the timestamp of the first node. Pushing a schedule to the first node to be propagated to each node in the network, wherein the schedule specifies when each node in each pair of neighboring nodes is in the transmitting mode or the receiving mode. The determining comprises: determining, from a topology database, a second group of nodes has not been synchronized to the timestamp of the first node; identifying neighboring nodes of each node in the second group of nodes from the topology database; generating additional instructions configured to cause the neighboring nodes of each node in the second group of nodes to continue communicating the timestamp until the neighboring nodes receive an indication that each node of the second group of nodes has been synchronized to the timestamp of the first node; and sending the additional instructions to the neighboring nodes of each node in the second group of nodes. The first node comprises a plurality of millimeter wave radios, wherein the instructions configured to cause the first node to communicate a timestamp of the first node comprises: selecting, by the first node, a first timestamp of one of the millimeter wave radios; synchronizing timestamps of each of the other millimeter wave radios to the first timestamp; and communicating the timestamp to neighboring nodes of the first node using the plurality of millimeter wave radios. The first node comprises a first directional antenna and a node neighboring the first node comprises a second directional antenna, further comprising: identifying coordinates of the second directional antenna from the data; and wherein the instructions comprise the coordinates and cause the first directional antenna to steer to the coordinates of the second directional antenna. A first node in the network has a first directional antenna and a second node in the network has a second directional antenna, and wherein the first node communicates data to the second node when the first directional antenna is steered to the second directional antenna and the second directional antenna is steered to the first directional antenna. The first group of nodes connect to the cloud controller without going through any other node in the network. A particular node in the network periodically sends a request for synchronization to its neighboring nodes to cause the neighboring nodes to synchronize their respective timestamps to a timestamp of the node and cause each neighboring node to send a request for synchronization to other neighboring nodes of the neighboring node.

Another innovative aspect includes the actions of maintaining, by a cloud controller, data representing a topology of a network of nodes, wherein the data indicates a first group of nodes that are connected to the cloud controller and indicate, for each node in the network, one or more respective neighboring nodes for the node, and wherein each node communicates wirelessly with a neighboring node by forming a transmitting node and receiving node pair during a particular time interval, wherein the transmitting node of the pair communicates data to the receiving node of the pair during a particular time interval when the transmitting node is in a transmitting mode and the receiving node is in a receiving mode; selecting, by the cloud controller, a first node that has not been added to the network according to the data; using the data to determine, by the cloud controller, neighboring nodes around the first node; generating, by the cloud controller, instructions configured to cause the neighboring nodes to discover the first node; sending the instructions to the neighboring nodes, thereby causing the neighboring nodes to discover the first node; and receiving an indication that the first node communicates wirelessly with the neighboring nodes.

Implementations can include one or more of the following features. The instructions cause the first node to synchronize its timestamp to a timestamp of one of the neighboring nodes. Distributing a schedule across the network of nodes, wherein the schedule coordinates future communication between each node in the network. A first node in the network has a first directional antenna and a second node in the network has a second directional antenna, and wherein the first node communicates data to the second node when the first directional antenna is steered to the second directional antenna and the second directional antenna is steered to the first directional antenna. The first node is in receiving mode, and wherein the first node steers a directional antenna in a full range of motion, and wherein the instructions configured to cause the neighboring nodes to discover the first node comprises: steering directional antennas of the neighboring nodes in a full range of motion while in transmitting node; determining, for one of the neighboring nodes, the directional antenna of the first node is steered to a respective directional antenna of the neighboring node; and storing the determination in the data. Identifying coordinates of a first directional antenna of the first node from the data; and wherein the instructions comprise the coordinates and cause directional antennas of the neighboring nodes to steer to the coordinates of the first directional antenna.

Particular embodiments of the subject matter described in this specification can be implemented so as to realize one or more of the following advantages. Some nodes can communicate only if their directional antennas are steered to directional antennas of other nodes. A cloud controller can coordinate communication between nodes having directional antennas when times are synchronized at nodes across a network. The cloud controller can enable scalable management of a complex network of nodes. The cloud controller can easily add a node to the network and synchronize a time of the node after the node is added. If a node stops communicating with the network, the cloud controller can reconnect the node to the network and resync a time of the node automatically.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
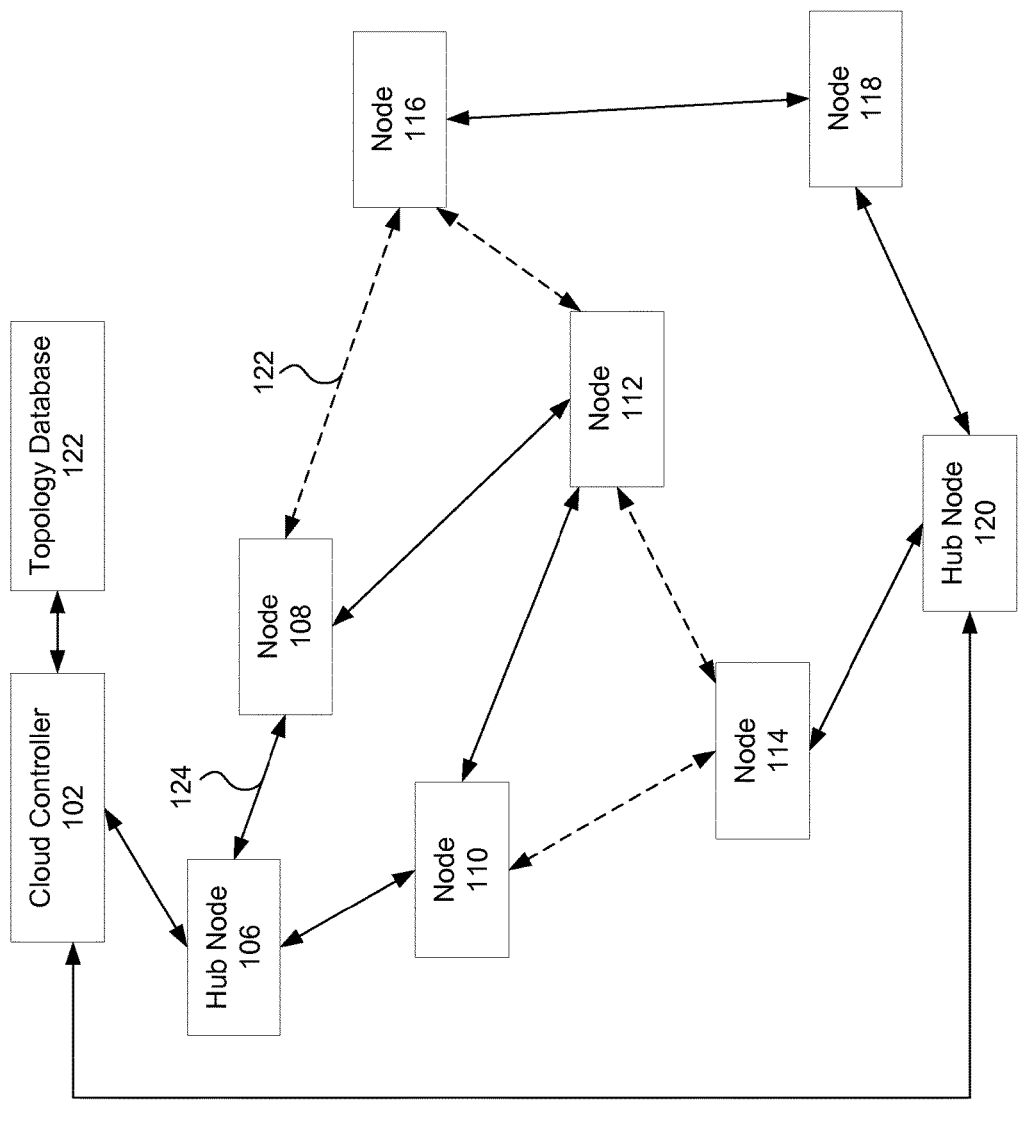
FIG. 1 illustrates an example architecture for a system that synchronizes time across a network of nodes.

FIG. 1 illustrates an example architecture 100 for a system that synchronizes time for a network of nodes. The network of nodes enables users to access wireless high speed Internet over large areas where Internet is not ubiquitous. For example, the network of nodes can be implemented in a remote village having little infrastructure to connect to the Internet.

The system includes a cloud controller 102 responsible for managing time synchronization across the network of nodes. In some implementations, the network of nodes is organized as a mesh network.

The network of nodes include hub nodes 106, 120 and regular nodes 108-118. Regular nodes can be relay nodes or access end-points, e.g., for Wi-Fi access. A relay node can relay data to other nodes in the network. An access end-point allow users to connect to an external network, e.g., the Internet, through the access end-point and can also relay data to other nodes in the network. Hub nodes can be relay nodes or access end-points and can also communicate with the cloud controller 102 directly. That is, while non-hub nodes can access the cloud controller 102 through any hub node, hub nodes can connect to the cloud controller 102 without going through any other node. For example, hub nodes 106, 120 have a direct connection to the cloud controller 102, as opposed to node 110, which can connect to the cloud controller 102 through hub node 106. In some implementations, hub nodes 106, 120 are wired to the external network and the other nodes are wireless.

Each node has one or more directional antennas used to communicate with neighboring nodes. For example, each node can include multiple millimeter wave radios, each having a directional antenna.

Generally, nodes with highly directional antennas provide higher bandwidth, but at the cost of being able to communicate with only one other radio of another node at a time. In particular, for the nodes to communicate, the directional antenna of the given radio can be steered to a directional antenna of the other radio in the other node. Also, a given node can communicate with two neighboring nodes at the same time if the given node includes two directional antennas, each steered to a respective neighboring node.

When two nodes communicate with each other during a particular time interval, the nodes can form a transmitting and receiving node pair for the particular time interval. By way of illustration, when the hub node 106 and the node 108 communicate, the hub node 106 can be in a transmitting mode and the node 108 can be in a receiving mode. In particular, a directional antenna of the hub node 106 is steered to a directional antenna of the node 108, thereby enabling the hub node 106 to send data to the node 108. In some implementations, when the node 108 sends a response to the hub node 106, the hub node 106 transitions to a receiving mode and the node 108 transitions to a transmitting mode.

The network of nodes in architecture 100 depicts an example topology with active connections and alternate connections at a particular point in time. Active connections are depicted with a solid line, e.g., active connection 124, and alternate connections are depicted with dashed lines, e.g., alternate connection 122. Active connections between nodes are connections in which data is actively transferred between the nodes. Alternate connections between nodes are connections in which data is potentially, but not currently, transferred between the nodes. For the alternate connection between two nodes to become an active connection, directional antennas of the two nodes can be steered towards each other as described above.

By way of illustration, the hub node 106 has an active connection with the node 108, which indicates a directional antenna of the hub node 106 is steered to a directional antenna of the node 108 at the particular point in time.

The node 108 has an active connection with the nodes 112, 106 and an alternate connection 122 with the node 116, which indicates the node 108 is communicating with the hub node 106 and the node 112, but is not communicating with the node 116 at the particular point in time.

To communicate across the network, the cloud controller 102 can transition active connections into alternate connections, and vice versa. In some implementations, the cloud controller 102 determines a schedule for the transitions of the connections across each node, which will be described with reference to FIG. 3. For example, at a future point in time, the node 108 can steer its directional antenna from a directional antenna of the node 112 to a directional antenna of the node 116, thereby creating an active connection between the node 108 and the node 116 and an alternate connection between the node 108 and the node 112.

The cloud controller 102 also communicates with a topology database 122. The topology database 122 can include information about each node in the network representing a topology of the network of nodes. The information for a particular node can include a number of radios in the node, a role of the node, e.g., hub, relay, or access point, nodes neighboring the node, and whether the node is added to, i.e., connected to, the network. In some implementations, the topology database 122 also specifies an optimal path for any given node to communicate with any other given node in the network. In particular, the optimal path can specify a series of intermediate nodes that relay data that minimizes latency.

The cloud controller 102 can communicate with the topology database 122 for adding or reconnecting nodes to the network. The topology database 122 will be described in more detail below with reference to FIG. 3.

In this specification, the term "database" will be used broadly to refer to any appropriate collection of data that maintains relations between data elements. The data not need be stored as tables, structured in any particular way, or structured at all, and the data in the database can be stored on storage devices in one or more locations. Thus, for example, the topology database 122 can include multiple collections of data, each of which may be organized and accessed differently.

Figure 2:
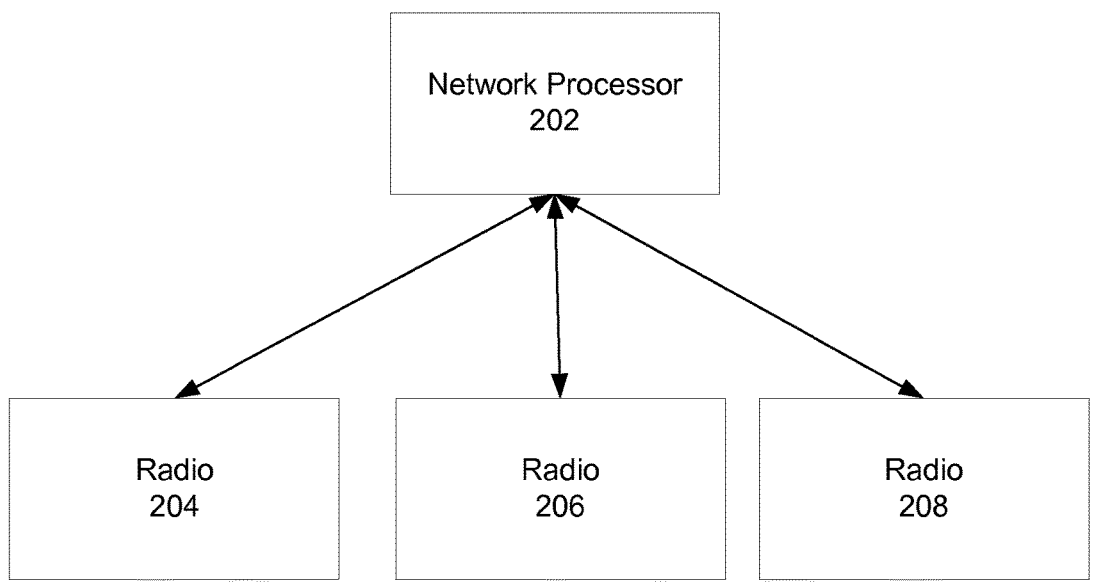
FIG. 2 illustrates an example architecture for a particular node in the network.

FIG. 2 illustrates an example architecture 200 for a particular node in the network having multiple radios 204-208. Each radio 204-208 can have a respective directional antenna steered towards another distinct node in the network. The node can have a network processor 202 that communicates with each radio 204-208. In some implementations, the network processor 202 syncs the time in the node by syncing a hardware timestamp, e.g., a media access control (MAC) timestamp, in each radio. This will be described further with reference to FIG. 3.

Figure 3:
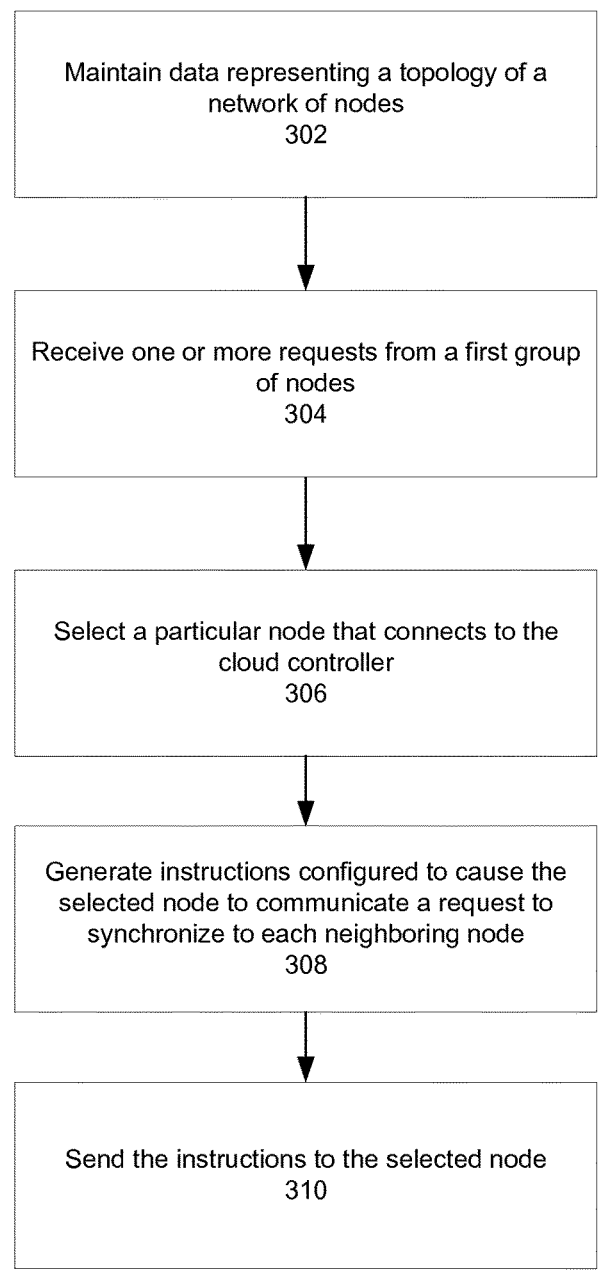
FIG. 3 is a flow diagram of an example process for synchronizing time by a cloud controller.

FIG. 3 is a flow diagram of an example process for synchronizing time by a cloud controller. In general, a system can use the example process to synchronize nodes in the network. Synchronizing nodes generally also requires discovery of the nodes. However, the system can alternatively perform the example process only for discovering nodes in the network. For convenience, the process will be described as being performed by an appropriately programmed system of one or more computers, e.g., the cloud controller 102 of FIG. 1.

The system maintains data representing a topology of a network of nodes (step 302). The data can be stored in a topology database, e.g., the topology database 122 of FIG. 1. The data can specify a first group of nodes in the network that is connected to the system. The first group of nodes can be hub nodes that are connected directly to the system, i.e., nodes that can connect to the system without going through other nodes.

The system receives one or more requests from the first group of nodes to connect to the network (step 304). In some implementations, each node can attempt to connect to, i.e., be discovered by, the system. The attempt to connect can occur upon boot-up of the node.

Each node can synchronize its timestamp in response to connecting to the system. That is, the process of connecting a node to the network includes the node synchronizing its timestamp to other nodes in the network. This will be described further below with reference to FIG. 5.

The system selects, from the first group of nodes, a particular node that connects to the system (step 306). In some implementations, the system selects the node that first responds to the request. In some other implementations, the system selects the node randomly from the first group. In yet some other implementations, the system selects the node that has a highest number of neighboring nodes. Generally, the first group of nodes, e.g., the hub nodes of the network, can be directly wired to an external network, e.g., the Internet, and therefore can be the nodes in the network that most reliably communicate with the system.

The system generates instructions configured to cause the selected node to communicate a request to synchronize each neighboring node of the selected node (step 308) and sends the instructions to the selected node (step 310).

Upon receiving the instructions, the selected node can scan for neighboring nodes. In some implementations, the system includes, in the instructions, coordinates from the topology database to which the directional antennas of the selected node can steer to locate the neighboring nodes. The instructions can cause the selected node to propagate, to each of its neighboring nodes, the request to synchronize their respective timestamps to a timestamp of the selected node. The request, e.g., a synchronization frame, can also include the timestamp of the selected node. This will be described with reference to FIGS. 4A-B.

If the system is performing only discovery and not synchronization, the system can propagate a request for each neighboring node to be discovered, which may be referred to as a discovery frame. The request can cause the neighboring node to continually attempt to connect to the system, e.g., by connecting to the cloud controller. Hub nodes can connect to the system directly, while regular nodes can connect to the system through wireless connections to the hub nodes. In some implementations, the request causes the nodes both to be discovered and for the nodes to synchronize their timestamps.

In some implementations, the request also includes a topology identifier. Each node can be preloaded with the topology identifier. Each node, then, can compare the preloaded topology identifier with the topology identifier in the instructions. If the topology identifiers match, the node can proceed to synchronize its timestamp to the timestamp in the instructions. This ensures the node synchronizes to an intended timestamp.

Each request received by a node can cause the node to propagate the request to neighboring nodes of the node. This can continue until each node in the network has been synchronized to the timestamp of the selected node. To synchronize a timestamp of a given node to the timestamp of the selected node, the node can store the timestamp of the selected node to memory of the given node.

When the request is used for synchronizing the nodes, each node can periodically send the request to synchronize time to neighboring nodes. This accounts for slight drifts of internal clocks of each node over time, e.g., which can be on the order of microseconds. This can also abstract time synchronization from the system, i.e., the cloud controller. That is, the system can assume that each node in the network has a synchronized timestamp across the network. Therefore, the system can push a schedule based on the synchronized timestamp, which will be described further below.

In some implementations, when sending the request to synchronize time, a particular node starts a timer. Until the timer expires, the node can prevent itself from entering in a receiving mode, i.e., the node will not receive any requests for synchronization. The timer can be slightly smaller than a periodicity of sending the request to synchronize time. This can prevent overloading the network with requests for synchronization.

In some other implementations, once the given node is synchronized, the given node sends an indication of synchronization to the system, e.g., through other nodes connected to the system, which can store the indication of synchronization in the topology database. Once every node is synchronized to a timestamp, the system can push the schedule based on the timestamp.

In some implementations, the node has multiple radios, as described above with reference to FIG. 2. The node can receive the instructions for synchronization to a timestamp of the selected node at a network processor of the node. The network processor can be connected, e.g., wired, to each radio, and can cause each radio to synchronize its timestamp to the timestamp of the selected node.

In some implementations, if the topology database stores indications of synchronization, the system determines a second group of nodes in the network has not been synchronized to the timestamp of the selected node from the topology database, which stores indications of synchronizations as described above. This can happen when nodes in the second group are unable to communicate with the remaining nodes in the network. For example, the nodes in the second group can have their antennas steered to neighboring nodes but a line-of-sight can be physically obstructed by an object.

The system can identify, using the topology database, neighboring nodes of each node in the second group of nodes that have synchronized time to the timestamp of the selected node.

The system can generate and send additional instructions to the identified neighboring nodes configured to cause the identified neighboring nodes to continue sending the request for synchronization to nodes in the second group until the system receives an indication of synchronization from each node in the second group. The instructions can be sent to the identified neighboring nodes by relaying the additional instructions through the network using the topology database. In some implementations, the system repeatedly attempts, e.g., using an exponential backoff algorithm, sending the request for synchronization, which includes the timestamp of the selected node.

After each node in the network is synchronized to the timestamp of the selected node, the system can push a schedule to the selected node that coordinates communication across the network. The schedule can specify when each node in each pair of neighboring nodes is in a transmitting mode or a receiving mode. With synchronized times, nodes can steer their directional antennas to proper positions at the same time. For example, the schedule can specify the selected node to steer its antenna to a first neighboring node from timestamp X to timestamp Y, where X and Y are a future delta from a current timestamp of the selected node. The schedule can then specify the selected node to steer its antenna to a second neighboring node from timestamp Y to timestamp Z, where the selected node is in transmitting mode while the second neighboring mode is in receiving mode.

Figure 4A:
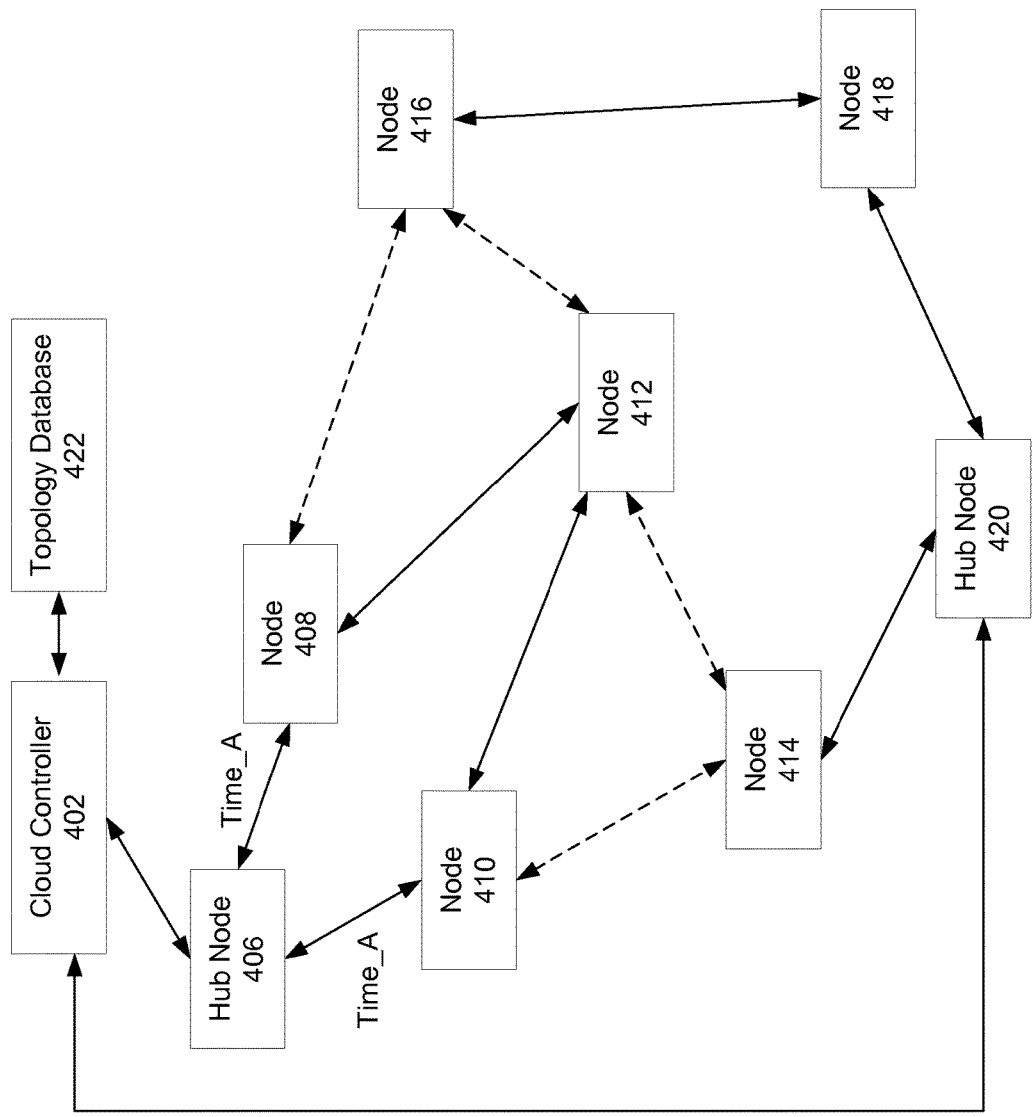
FIGS. 4A-B are a diagrams illustrating how time is synchronized through nodes of the network.

FIG. 4A is a diagram 400 illustrating how time is synchronized after receiving instructions for synchronization at a hub node 406 of the network. The hub node 406 can receive the instructions from a cloud controller 402. The hub node 406 can have a timestamp of Time_A. The hub node 406 has active connections to nodes 408, 410, which indicates the hub node 406 has multiple directional antennas, each steered to the respective nodes 408, 410. The hub node 406 can send a request for synchronization, along with the timestamp of the hub node 406, i.e., Time_A, to the nodes 408, 410.

Figure 4B:
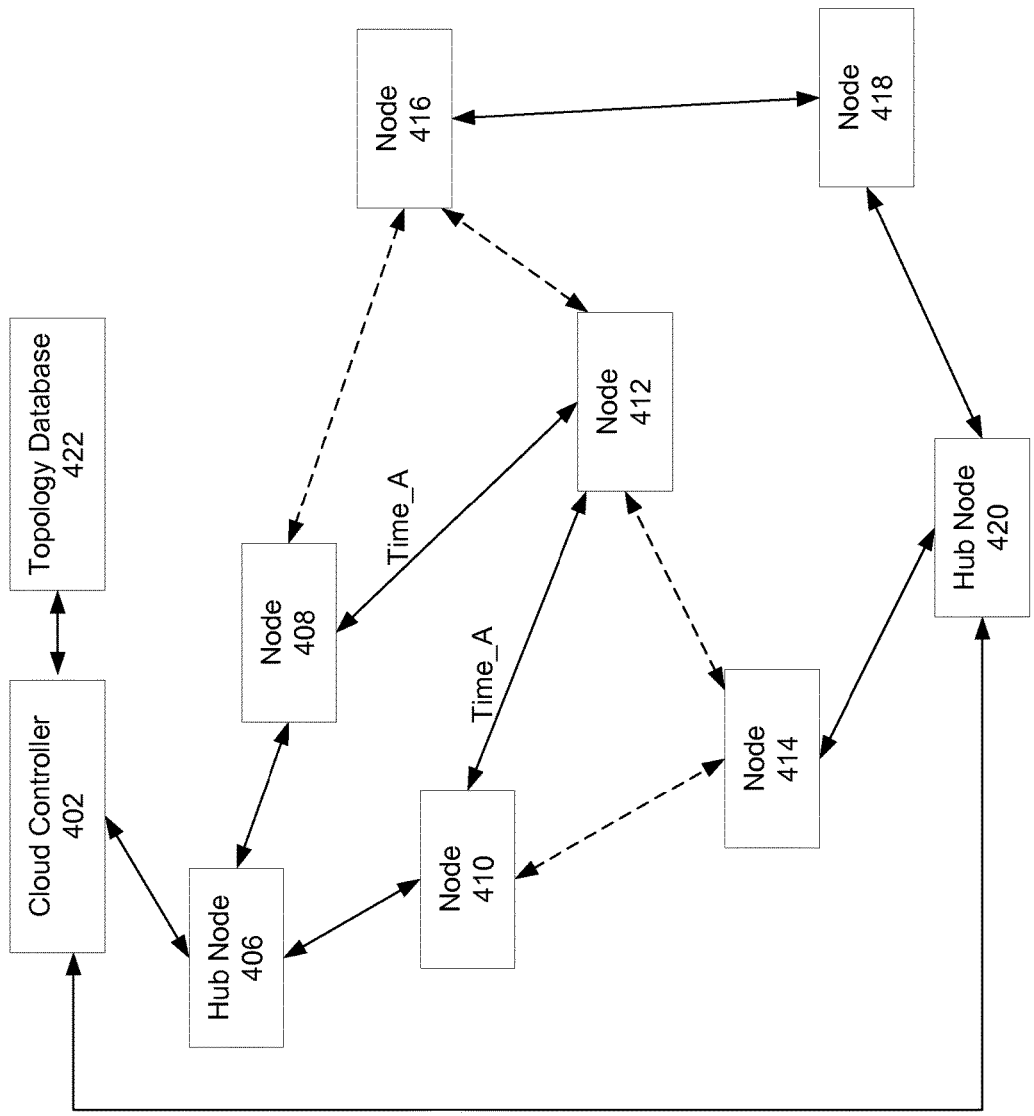

FIG. 4B is a diagram 422 illustrating how time is synchronized after the nodes 408, 410 receive the request for synchronization from the hub node 406. Upon receiving the request for synchronization, the nodes 408, 410 can synchronize their respective timestamps to Time_A.

The node 408 has an active connection with the node 412 and an alternate connection with node 416. Therefore, the node 408 sends the request for synchronization to timestamp Time_A to the node 412. Because a directional antenna of the node 408 is not steered to a directional antenna of the node 416, the node 408 cannot send the request for synchronization to the node 416 at the current point of time.

In some implementations, after the node 408 sends the request including Time_A to the node 412, the node 408 can enter a scan mode. The scan mode can cause the node 408 to search for other neighboring nodes. For example, the scan mode can cause the directional antenna to steer in a full range of motion until the node 408 locates a directional antenna of another node. The node 408 can determine whether the other node has not synchronized its timestamp to Time_A. In some implementations, the system sends snapshots of indications of synchronization to the hub nodes 406, 420 for distribution. In some other implementations, the node 408 awaits a response from the other node indicating whether the other node has been synchronized. In yet some other implementations, the node 408 sends the request for synchronization to the other node regardless of whether the other node has synchronized its timestamp to Time_A.

In some implementations, after the node 408 sends the request including Time_A to the node 412, the node awaits instructions from the cloud controller 402. The cloud controller 402 can determine the node 416 has not synchronized its timestamp to Time_A, e.g., because the node 416 has not connected to the cloud controller 402, and generate instructions to cause the node 408 to form an active connection with the node 416 and send a request to synchronize the timestamp of the node 416 to Time_A, as described above with reference to FIG. 3.

Similarly, upon receiving the request for synchronization from the hub node 406, the node 410 sets its timestamp to Time_A and sends a request for synchronization including Time_A to node 412 through an active connection. In some implementations, the node 412 ignores the request if the node 412 has already synchronized its timestamp because of a request for synchronization from the node 408.

Figure 5:
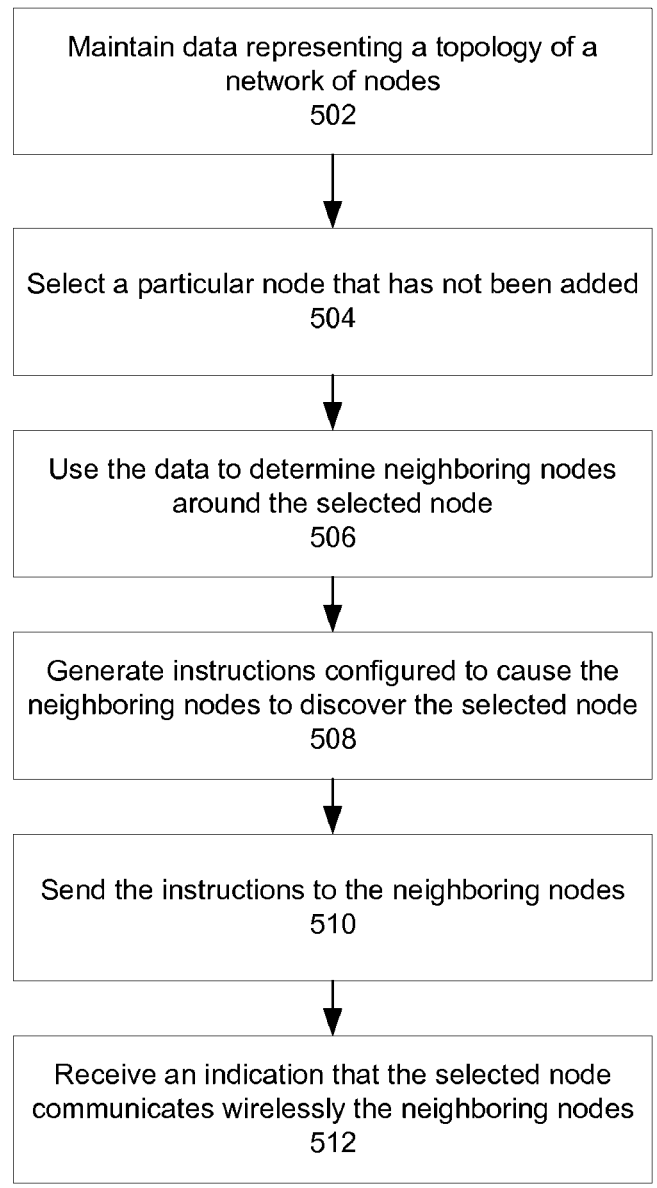
FIG. 5 is a flow diagram of an example process for having an unadded node in the network be discovered by neighboring nodes.

FIG. 5 is a flow diagram of an example process for having an unadded node in the network be discovered by neighboring nodes. For convenience, the process will be described as being performed by an appropriately programmed system of one or more computers, e.g., the cloud controller 102 of FIG. 1. In some implementations, the system attempts to discover every undiscovered node, as identified in a topology database, before synchronizing time across the network.

The system maintains data representing a topology of the network (step 502). The data can be stored in the topology database, as described above with reference to FIG. 3.

The system selects a particular node that has not been added to the network according to the data (step 504). The system can analyze the topology database, which stores whether a particular node has been added to the network, to select the particular node. In some cases, the selected node can have previously attempted to be added to the network, but can have failed, e.g., due to physical obstruction.

When the selected node attempts to be added to the network, the selected node can enter a receiving mode. The selected node can also sweep a directional antenna within its full range to attempt to connect with a neighboring node. The full range can be predetermined by the radio.

The system uses the data to determine neighboring nodes around the selected node (step 506). In some implementations, the system queries the topology database to determine coordinates of the neighboring nodes. In particular, the topology database can include coordinates of a directional antenna of the selected node to which the directional antennas of the neighboring nodes should steer.

The system generates instructions configured to discover the selected node (step 508) and sends the instructions to the neighboring nodes, thereby causing the neighboring nodes to discover the selected node (step 510). The instructions can cause the neighboring nodes to steer their respective directional antennas to coordinates of the directional antenna of the selected node. In some implementations, the instructions cause the respective directional antennas of the neighboring nodes to steer in a full range to search for a stronger connection to the selected node. The neighboring nodes can each be in a transmitting mode. The system can determine, for one of the neighboring nodes, the directional antenna of the selected node is steered to a respective directional antenna of the one neighboring node. In some implementations, only one of the neighboring nodes is needed to make the connection for the selected node to be added to the network. When the selected node connects to the one neighboring node, the selected node can send an indication that a connection was made to the system. The selected node can then communicate wirelessly with the one neighboring node.

In some implementations, the instructions cause the selected node to synchronize its timestamp to a timestamp of the neighboring node, as described above with reference to FIG. 3.

The system can also distribute a schedule across the network of nodes, as described above with reference to FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   maintaining, by a cloud controller, topology data for a network of a plurality of nodes, wherein the topology data indicates, for each node in the network, one or more respective neighboring nodes for the node, and wherein neighboring nodes are nodes in the network that are configured to communicate wirelessly by forming directional steering pairs wherein a transmitter node of a directional steering pair steers a first directional antenna of the transmitter node in a first direction of a receiver node of the directional steering pair, and wherein a receiver node of the directional steering pair steers a second directional antenna of the receiver node in a second direction of the transmitter node of the directional steering pair;
   receiving, at the cloud controller, one or more requests to connect to the network provided by one or more requesting nodes of the plurality of nodes;
   selecting, by the cloud controller among the one or more requesting nodes, a hub node to which all other nodes in the network will synchronize timestamps; and
   generating, by the cloud controller, instructions operable to cause the selected hub node to communicate a timestamp of the hub node to each neighboring node of the hub node according to the topology data and to cause each neighboring node of the hub node to forward the timestamp received from the hub node to each of one or more other neighboring nodes of the neighboring node according to the topology data, wherein each node receiving a forwarded timestamp of the hub node is configured to synchronize a local timestamp maintained by the node to the forwarded timestamp of the hub node; and
   synchronizing the nodes in the network to the timestamp of the hub node including sending the generated instructions to the hub node, thereby causing the hub node to forward the timestamp to one or more neighboring nodes of the hub node.

2. The method of claim 1, further comprising:
receiving, by the hub node, the instructions; and
performing, by the hub node, a scan to identify one or more neighboring nodes; and
forwarding, by the hub node, the instructions to each of the identified one or more neighboring nodes.

3. The method of claim 2, further comprising:
performing, by each neighboring node of the hub node, a scan to identify one or more other respective neighboring nodes of the neighboring node; and
forwarding, by each neighboring node, the instructions to each of the identified one or more other neighboring nodes.

4. The method of claim 1, further comprising:
pushing, by the cloud controller to the hub node, a schedule to be propagated to each node in the network, wherein the schedule specifies when each node in each directional steering pair is a transmitter node or a receiver node of the directional steering pair.

5. The method of claim 1, further comprising:
determining, from the topology data, a second group of nodes that have not been synchronized to the timestamp of the hub node;
identifying neighboring nodes of each node in the second group of nodes from the topology data;
generating additional instructions operable to cause the neighboring nodes of each node in the second group of nodes to continue communicating the timestamp until the neighboring nodes receive an indication that each node of the second group of nodes has been synchronized to the timestamp of the hub node; and
sending the additional instructions to the neighboring nodes of each node in the second group of nodes.

6. The method of claim 1, wherein the hub node comprises a plurality of millimeter wave radios, and wherein the instructions are operable to cause the hub node to perform operations comprising:
selecting, by the hub node, a first timestamp of one of the millimeter wave radios of the plurality of millimeter wave radios;
synchronizing timestamps of each of the other millimeter wave radios to the first timestamp; and
communicating the timestamp to neighboring nodes of the hub node using one or more of the plurality of millimeter wave radios.

7. The method of claim 1, wherein the hub node comprises a first directional antenna, and wherein a neighboring node of the hub node comprises a second directional antenna, and further comprising:
identifying, by the cloud controller, coordinates of the second directional antenna from the topology data;
and wherein generating the instructions comprises generating instructions that identify the coordinates of the second directional antenna and cause the hub node to steer the first directional antenna toward the coordinates of the second directional antenna.

8. The method of claim 1, wherein each node in the network comprises one or more processors and a plurality of directional millimeter wave radios.

9. The method of claim 1, wherein the first group of nodes are nodes that are capable of communicating directly with the cloud controller without communicating through any intermediary node in the network.

10. The method of claim 1, where a particular node in the network periodically sends a request for synchronization to its neighboring nodes to cause the neighboring nodes to synchronize their respective timestamps to a timestamp of the node and to cause each neighboring node to send a request for synchronization to other neighboring nodes of the neighboring node.

11. A method comprising:
maintaining, by a cloud controller, topology data for a network of a plurality of nodes, wherein the topology data indicates, for each node in the network, one or more respective neighboring nodes for the node, and wherein neighboring nodes are nodes in the network that are configured to communicate wirelessly by forming directional steering pairs wherein a transmitter node of a directional steering pair steers a first directional antenna of the transmitter node in a first direction of a receiver node of the directional steering pair, and wherein a receiver node of the directional steering pair steers a second directional antenna of the receive node in a second direction of the transmitter node of the directional steering pair;
selecting, by the cloud controller, an undiscovered node that has not been added to the network according to the topology data;
using the topology data to determine, by the cloud controller, neighboring nodes around the undiscovered node;
generating, by the cloud controller, instructions operable to cause the neighboring nodes of the undiscovered node to discover the undiscovered node; and
sending the instructions to the neighboring nodes, thereby causing the neighboring nodes to discover the undiscovered node.

12. The method of claim 11, wherein the instructions cause the undiscovered node to synchronize a local timestamp maintained by the undiscovered node to a forwarded timestamp received from one of the neighboring nodes.

13. The method of claim 12, further comprising distributing, by the cloud controller, a schedule across the network of nodes, wherein the schedule coordinates future communication between each node in the network.

14. The method of claim 11, wherein a first node in the network comprises a first directional antenna and a second node in the network comprises a second directional antenna, and wherein the first node is configured to communicate data to the second node when the first directional antenna is steered to the second directional antenna and the second directional antenna is steered to the first directional antenna.

15. The method of claim 11, wherein the instructions operable to cause the neighboring nodes to discover the undiscovered node cause each neighboring node to perform operations comprising:
steering, by the neighboring node, one or more directional antennas of the neighboring node in a respective full range of motion while in transmitting node;
determining, by the neighboring node, whether the directional antenna of the neighboring node is steered to a respective directional antenna of the undiscovered node; and
whenever the directional antenna of the neighboring node is steered to a respective directional antenna of the undiscovered node, transmitting, to the cloud controller, an indication that the undiscovered node has been discovered.

16. The method of claim 11, further comprising:
identifying, by the cloud controller, coordinates of a first directional antenna of the undiscovered node from the topology data;
and wherein generating the instructions comprises generating instructions that identify the coordinates of the first direction antenna and cause other directional antennas of the neighboring nodes to steer toward the coordinates of the first directional antenna of the undiscovered node.

17. A system comprising:
one or more computers and one or more storage devices storing instructions that are operable, when executed by the one or more computers, to cause the one or more computers to perform operations comprising:
maintaining, by a cloud controller, topology data for a network of a plurality of nodes, wherein the topology data indicates, for each node in the network, one or more respective neighboring nodes for the node, and wherein neighboring nodes are nodes in the network that are configured to communicate wirelessly by forming directional steering pairs wherein a transmitter node of a directional steering pair steers a first directional antenna of the transmitter node in a first direction of a receiver node of the directional steering pair, and wherein a receiver node of the directional steering pair steers a second directional antenna of the receiver node in a second direction of the transmitter node of the directional steering pair;
receiving, at the cloud controller, one or more requests to connect to the network provided by one or more requesting nodes of the plurality of nodes;
selecting, by the cloud controller among the one or more requesting nodes, a hub node to which all other nodes in the network will synchronize timestamps; and
generating, by the cloud controller, instructions operable to cause the selected hub node to communicate a timestamp of the hub node to each neighboring node of the hub node according to the topology data and to cause each neighboring node of the hub node to forward the timestamp received from the hub node to each of one or more other neighboring nodes of the neighboring node according to the topology data, wherein each node receiving a forwarded timestamp of the hub node is configured to synchronize a local timestamp maintained by the node to the forwarded timestamp of the hub node; and
synchronizing the nodes in the network to the timestamp of the hub node including sending the generated instructions to the hub node, thereby causing the hub node to forward the timestamp to one or more neighboring nodes of the hub node.

18. The system of claim 17, wherein the instructions, when executed by the hub node, cause the hub node to perform operations comprising:
receiving, by the hub node, the instructions; and
performing, by the hub node, a scan to identify one or more neighboring nodes; and
forwarding, by the hub node, the instructions to each of the identified one or more neighboring nodes.

19. The system of claim 18, wherein the instructions, when executed by each neighboring node of the hub node, cause the neighboring node to perform operations comprising:
performing, by the neighboring node of the hub node, a scan to identify one or more other respective neighboring nodes of the neighboring node; and
forwarding, by the neighboring node, the instructions to each of the identified one or more other neighboring nodes.

20. The system of claim 17, wherein the operations further comprise:

pushing, by the cloud controller to the hub node, a schedule to be propagated to each node in the network, wherein the schedule specifies when each node in each directional steering pair is a transmitter node or a receiver node of the directional steering pair.

21. The system of claim 17, wherein the operations further comprise:
determining, from the topology data, a second group of nodes that have not been synchronized to the timestamp of the hub node;
identifying neighboring nodes of each node in the second group of nodes from the topology database;
generating additional instructions operable to cause the neighboring nodes of each node in the second group of nodes to continue communicating the timestamp until the neighboring nodes receive an indication that each node of the second group of nodes has been synchronized to the timestamp of the hub node; and
sending the additional instructions to the neighboring nodes of each node in the second group of nodes.

22. The system of claim 17, wherein the hub node comprises a plurality of millimeter wave radios, and wherein the instructions are operable to cause the hub node to perform operations comprising:
selecting, by the hub node, a first timestamp of one of the millimeter wave radios of the plurality of millimeter wave radios;
synchronizing timestamps of each of the other millimeter wave radios to the first timestamp; and
communicating the timestamp to neighboring nodes of the hub node using one or more of the plurality of millimeter wave radios.

23. The system of claim 17, wherein the hub node comprises a first directional antenna, and wherein a neighboring node of the hub node comprises a second directional antenna, and wherein the operations further comprise:
identifying, by the cloud controller, coordinates of the second directional antenna from the topology data;
and wherein generating the instructions comprises generating instructions that identify the coordinates of the second directional antenna and cause the hub node to steer the first directional antenna toward the coordinates of the second directional antenna.

24. The system of claim 17, wherein each node in the network comprises one or more processors and a plurality of directional millimeter wave radios.

25. The system of claim 17, wherein the first group of nodes are nodes that are capable of communicating directly with to the cloud controller without communicating through any intermediary node in the network.

26. The system of claim 17, where a particular node in the network is configured to periodically send a request for synchronization to its neighboring nodes to cause the neighboring nodes to synchronize their respective timestamps to a timestamp of the node and to cause each neighboring node to send a request for synchronization to other neighboring nodes of the neighboring node.

27. The method of claim 1, wherein selecting, by the cloud controller among the one or more requesting nodes, a hub node to which all other nodes in the network will synchronize timestamps comprises selecting a particular node that first provided a respective request to connect to the network.

28. The system of claim 17, wherein selecting, by the cloud controller among the one or more requesting nodes, a hub node to which all other nodes in the network will synchronize timestamps comprises selecting a particular node that first provided a respective request to connect to the network.

\* \* \* \* \*